United States Patent
Stahl et al.

(10) Patent No.: US 10,922,046 B2
(45) Date of Patent: Feb. 16, 2021

(54) METHOD FOR PROCESSING A PLURALITY OF A/V SIGNALS IN A RENDERING SYSTEM AND ASSOCIATED RENDERING APPARATUS AND SYSTEM

(71) Applicant: INTERDIGITAL CE PATENT HOLDINGS, SAS, Paris (FR)

(72) Inventors: Niclas Stahl, Sartrouville (FR); Philippe Gilberton, Geveze (FR)

(73) Assignee: Interdigital CE Patent Holdings, SAS, Paris (FR)

(*) Notice: Subject to any disclaimer, the term of this patent is extended or adjusted under 35 U.S.C. 154(b) by 0 days.

(21) Appl. No.: 16/416,121

(22) Filed: May 17, 2019

(65) Prior Publication Data

US 2019/0354341 A1    Nov. 21, 2019

(30) Foreign Application Priority Data

May 17, 2018 (EP) .................................... 18305613

(51) Int. Cl.
*G06F 3/16* (2006.01)
*G06F 3/14* (2006.01)
(Continued)

(52) U.S. Cl.
CPC ............ *G06F 3/165* (2013.01); *G06F 3/1423* (2013.01); *G10L 15/08* (2013.01); *G10L 15/22* (2013.01); *G10L 25/21* (2013.01); *H04N 5/45* (2013.01); *H04N 5/607* (2013.01); *G10L 2015/088* (2013.01)

(58) Field of Classification Search
None
See application file for complete search history.

(56) References Cited

U.S. PATENT DOCUMENTS 6,748,237 B1    6/2004  Bates et al.
7,124,365 B2   10/2006  Cavallerano et al.
(Continued)

FOREIGN PATENT DOCUMENTS

JP    2010-109792    *  5/2010    ............... H04N 5/60

OTHER PUBLICATIONS

Bartkova et al., "Prosodic Parameters and Prosodic Structures of French Emotional Data", Speech Prosody 2016, Boston, Massachusetts, USA, May 31, 2016, pp. 644-648.
(Continued)

*Primary Examiner* — James R Marandi
(74) *Attorney, Agent, or Firm* — Invention Mine LLC (57) ABSTRACT

The disclosure relates to a method for processing at least first and second audiovisual signals in a rendering system. Each of the first and second audiovisual signals include a video content and an audio content. The rendering system having a main display, an auxiliary display and a first audio output. The method includes: displaying the video content of the first audiovisual signal on the main display and the video content of the second audiovisual signal on the auxiliary display and playing the audio content of the first audiovisual signal on the first audio output, detecting an event in the audio content of the second audiovisual signal, and upon detection of the event, playing the audio content of the second audiovisual signal, instead of the audio content of the first audiovisual signal.

22 Claims, 4 Drawing Sheets

(51) Int. Cl.
*G10L 15/08* (2006.01)
*G10L 15/22* (2006.01)
*G10L 25/21* (2013.01)
*H04N 5/45* (2011.01)
*H04N 5/60* (2006.01)

(56) References Cited

U.S. PATENT DOCUMENTS

| | | | |
|---|---|---|---|
| 7,293,279 B1 * | 11/2007 | Asmussen | H04N 5/4401 348/E5.099 |
| 8,086,168 B2 | 12/2011 | Moran et al. | |
| 9,077,581 B2 | 7/2015 | Moran et al. | |
| 2001/0049826 A1 | 12/2001 | Wilf | |
| 2003/0167174 A1 | 9/2003 | Dagtas et al. | |
| 2004/0255336 A1 | 12/2004 | Logan et al. | |
| 2005/0174489 A1 * | 8/2005 | Yokoyama | H04N 21/4383 348/553 |
| 2012/0284421 A1 | 11/2012 | Xiao et al. | |
| 2013/0278828 A1 | 10/2013 | Todd | |
| 2015/0033253 A1 | 1/2015 | Yoshioka | |
| 2015/0082349 A1 * | 3/2015 | Ishtiaq | H04N 21/23418 725/40 |
| 2015/0348538 A1 * | 12/2015 | Donaldson | G10L 15/08 704/235 |
| 2017/0060526 A1 | 3/2017 | Barton et al. | |

OTHER PUBLICATIONS

Khan et al., "An Intelligent System for Spoken Term Detection That Uses Belief Combination", IEEE Intelligent Systems, vol. 32, Issue 1, Jan.-Feb. 2017, pp. 70-79.

Lugger et al., "The Relevance of Voice Quality Features in Speaker Independent Emotion Recognition", IEEE International Conference on Acoustics, Speech and Signal Processing (ICASSP '07), Honolulu, Hawaii, USA, Apr. 15, 2007, pp. IV17-IV20.

Mohammadi et al., "Automatic Personality Perception: Prediction of Trait Attribution Based on Prosodic Features—Extended Abstract", IEEE International Conference on Affective Computing and Intelligent Interaction (ACII 2015), Xian, China, Sep. 21, 2015, pp. 484-490.

* cited by examiner

METHOD FOR PROCESSING A PLURALITY OF A/V SIGNALS IN A RENDERING SYSTEM AND ASSOCIATED RENDERING APPARATUS AND SYSTEM

1. REFERENCE TO RELATED EUROPEAN APPLICATION

This application claims priority from European Patent Application No. 18305613.4, entitled "METHOD FOR PROCESSING A PLURALITY OF A/V SIGNALS IN A RENDERING SYSTEM AND ASSOCIATED RENDERING APPARATUS AND SYSTEM", filed on May 17, 2018, the contents of which are hereby incorporated by reference in its entirety.

2. TECHNICAL FIELD

The present disclosure relates generally to audiovisual systems with multiple screens and the way of rendering audiovisual signals on these systems.

3. BACKGROUND ART

Current audiovisual systems may comprise a plurality of screens for rendering simultaneously a plurality of audiovisual signals. Such systems allow the user to watch two A/V contents (A/V for audiovisual) at the same time. This is particularly useful when a viewer wants to watch one channel while monitoring another channel.

One example is when a viewer wants to watch a football match on one channel while at the same time waiting for the appearance of a specific artist on another channel. Another example is when the user wants to watch a talk show on one channel while still wanting to have a rough idea of what's going on in a football match.

One solution to this problem is Picture-in-Picture that allows displaying one channel in a small picture inside the picture for a main channel that fills the screen of a display device of the rendering system.

In that case, existing solutions render the audio of the main channel on the audio output(s), for example loudspeaker(s), of the rendering system, while the other channel is muted.

This can create some problems for the viewers as it is not always possible to judge from the small picture alone when the other channel becomes interesting.

In addition, when the football match starts to 'heat up', the viewer must switch the channels to get the sound for the match.

4. SUMMARY

The present disclosure provides new facilities for rendering two audiovisual signals in a rendering system comprising at least two displays and at least one audio output. The term "display" designates any support for displaying video content. The two displays may relate to distinct entities (two distinctive screens) or to two display windows displayed on a same screen like in a PIP (Picture-in-Picture) system.

The present disclosure relates to a method for processing at least first and second audiovisual signals in a rendering system, each of said first and second audiovisual signals comprising a video content and an audio content, said rendering system comprising a main display, an auxiliary display and a first audio output, said method comprising:

displaying the video content of the first audiovisual signal on the main display and the video content of the second audiovisual signal on the auxiliary display and playing the audio content of the first audiovisual signal on the first audio output, detecting an event in the audio content of the second audiovisual signal, and upon detection of the event, playing the audio content of the second audiovisual signal, instead of the audio content of the first audiovisual signal.

According to this embodiment, the audio content of the second audiovisual signal is automatically rendered by the audio output (called first audio output) of the rendering system upon detection of an event. The viewer can then listen to the audio content of the second audiovisual signal and is informed that an event of interest has occurred in the second audiovisual signal. He can then decide to switch manually the video contents displayed on the main display and the auxiliary display if he considers that, based on what he listens, the video content of the second audiovisual signal should be displayed on the main display. In this embodiment, the rendering system is for example a TV receiver equipped with the PIP function. The main display is the screen of the TV receiver and the auxiliary display is a PIP window displayed on the screen. The first audio output is the audio output of the TV receiver.

In another embodiment, the rendering system further comprises, in addition to the first audio output, a second audio output. In this embodiment, in the absence of detection of the event, the audio content of the first audiovisual signal is played in the first audio output and the audio content of the second audiovisual signal is muted in the second audio output and, upon detection of the event, the audio content of the first audiovisual signal is muted in the first audio output and the audio content of the second audiovisual signal is played in the second audio output. In this embodiment the rendering system comprises for example a TV receiver and a tablet. The main display is the screen of the TV receiver and the auxiliary display is the screen of the tablet. The first audio output is the audio output of the TV receiver and the second audio output is the audio output of the tablet.

According to an embodiment, the video contents of the first and second audiovisual signals are automatically switched upon detection of the event. Upon detection of the event, the video content of the second audiovisual signal is displayed on the main display while the video content of the first audiovisual signal is displayed on the auxiliary display.

According to another embodiment, the audio content and/or the video content of the first audiovisual signal are/is stored in a storage device. Thus, when the viewer is no more interested by the content of the second audiovisual signal, he can have access to the content of the first audiovisual signal that he missed.

According to an embodiment, the event is linked to the audio power level of the audio content of the second audiovisual signal. When the audio power level exceeds a predetermined threshold, it can be considered that an important event is occurring in the second audiovisual signal. In this embodiment, the detection of an event in the audio content of the second audiovisual signal comprises:

measuring an average audio power level of the audio content of the second audiovisual signal over a sliding temporal window having a predetermined duration, and comparing said average audio power level with a predetermined audio power level threshold, said event being detected when said average audio power level is greater than said predetermined audio power level threshold.

According to another embodiment, the event is linked to predetermined emotions detected in the audio content of the second audiovisual signal. The emotions can be for example stress, anxiety or happiness. In this embodiment, the detection of an event in the audio content of the second audiovisual signal comprises:

detecting at least one predetermined emotion in the audio content of the second audiovisual signal, said event being detected when at least one predetermined emotion is detected in the audio content of the second audiovisual signal.

According to another embodiment, the event is linked to a word or plurality of words pronounced in the second audiovisual signal. In this embodiment, the detection of an event in the audio content of the second audiovisual signal comprises:

applying a speech recognition algorithm to the audio content of the second audiovisual signal, and detecting at least one predetermined word in the audio content of the second audiovisual signal, said event being detected when said at least one predetermined word is detected in the audio content of the second audiovisual signal.

According to an embodiment, the detection of an event in the audio content of the second audiovisual signal comprises:

applying a speech recognition algorithm to the audio content of the second audiovisual signal, counting a number of words per time unit, comparing said number of words per time unit with a predetermined threshold, and detecting at least one predetermined word in the audio content of the second audiovisual signal, said event being detected when the number of words per time unit is greater than said predetermined threshold.

The present disclosure also relates to an apparatus for processing at least first and second audiovisual signals in a rendering system, each of said first and second audiovisual signals comprising a video content and an audio content, said rendering system comprising a main display, an auxiliary display and a first audio output all connected to the apparatus, said apparatus comprising:

a controller for controlling the display of the video content of the first and second audiovisual signals respectively on the main display and the auxiliary display and the playback of the audio content of the first audiovisual signal on the first audio output, a detector for detecting an event in the audio content of the second audiovisual signal, the controller being configured to, upon detection of an event by the detector, play the audio content of the second audiovisual signal, instead of the audio content of the first audiovisual signal.

According to an embodiment, when the rendering system further comprises a second audio output, the controller is configured to, in the absence of detection of the event, to play the audio content of the first audiovisual signal on the first audio output and to mute the audio content of the second audiovisual signal on the second audio output and, upon detection of the event, to mute the audio content of the first audiovisual signal on the first audio output and to play the audio content of the second audiovisual signal on the second audio output.

According to an embodiment, the controller is further configured to, upon detection of the event, display the video content of the second audiovisual signal on the main display and the video content of the first audiovisual signal on the auxiliary display.

According to an embodiment, the controller is further configured to, upon detection of the event, store the audio content and/or the video content of the first audiovisual signal in a storage device.

According to an embodiment, the detection of an event in the audio content of the second audiovisual signal is based on at least one of the following parameters:

the average audio power level of the audio content of the second audiovisual signal over a sliding temporal window having a predetermined duration, the presence of at least one predetermined emotion in the audio content of the second audiovisual signal, the presence of at least one predetermined word in the audio content of the second audiovisual signal, and a number of words per time unit in the audio content of the second audiovisual signal.

The present disclosure also relates to a system for rendering at least first and second audiovisual signals, each of said first and second audiovisual signals comprising a video content and an audio content, said rendering system comprising a main display, an auxiliary display, a first audio output, a second audio output if appropriate and an apparatus as defined hereinabove. This rendering system is for example a TV receiver equipped with the PIP function. The main display is the screen of the TV receiver and the auxiliary display is a PIP window displayed on the screen. The first audio output is for instance the loudspeaker of the TV receiver.

The present disclosure also relates to a computer program product comprising program code instructions for implementing the method according to the above-defined method, when said program is executed on a computer or a processor.

5. BRIEF DESCRIPTION OF THE DRAWINGS

The embodiments of the invention can be better understood with reference to the following description and drawings, given by way of example and not limiting the scope of protection, and in which.

6. DESCRIPTION OF EMBODIMENTS

The present method is used for processing at least a first audiovisual signal SG1 and a second audiovisual signal SG2. These signals are for example TV signals. They can be received via a tuner/demodulator (broadcast signals) or via a set-top box or a gateway (internet signals).

Each of these audiovisual signals SG1 and SG2 comprises a video content, respectively V1 and V2, and an audio content, respectively A1 and A2.

These signals are processed in a rendering system comprising at least a main display and an auxiliary display and an audio output. As mentioned before, the two displays may relate to two distinct entities (for example a first TV screen and a second TV screen, or a TV screen and tablet screen) or to two display windows displayed on a same screen like in a PIP (Picture-in-Picture) system.

According to an embodiment, the size of the main display is advantageously greater than the size of the auxiliary display. In a PIP system, the main display is the big window and the auxiliary display is the small window.

Figure 1:
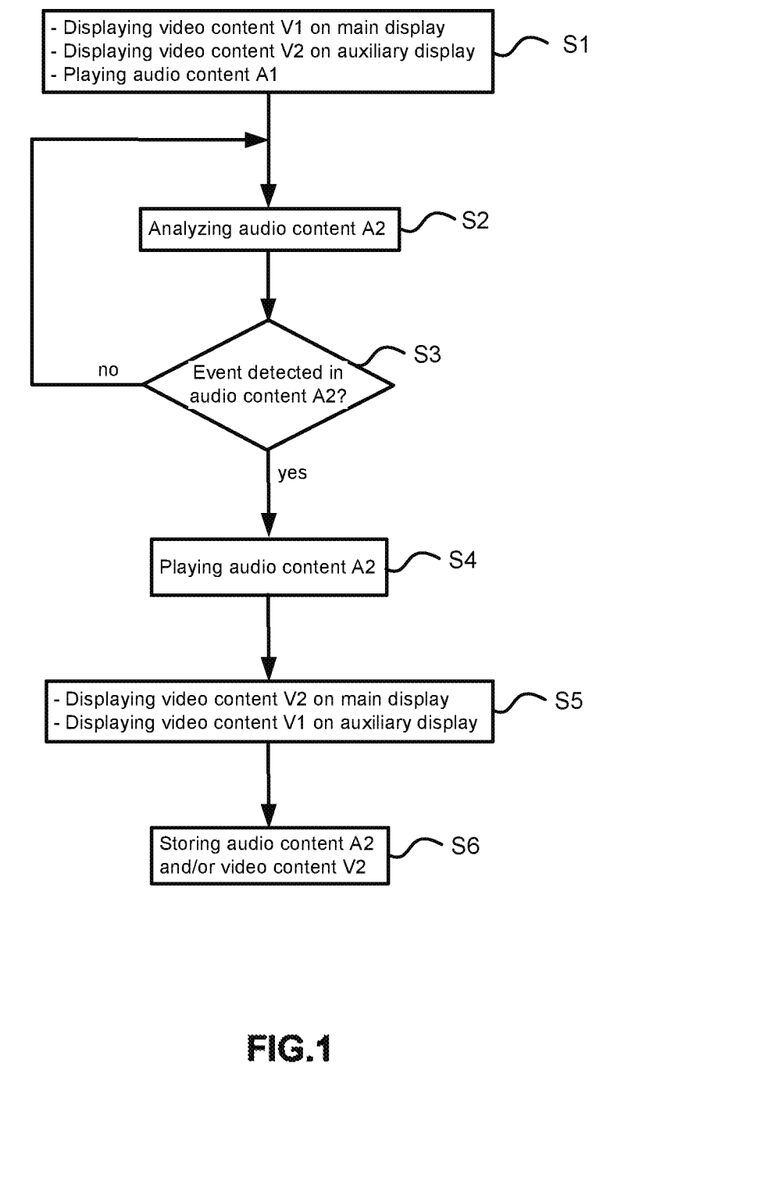
FIG. 1 is a flow chart of the successive steps implemented when performing a method according to a first embodiment of the invention.

FIG. 1 is the flow chart of the method of an embodiment of the invention for a rendering system comprising a main display, an auxiliary display and an audio output for these two displays.

Step S1

In a first step S1, the video content V1 of the first audiovisual signal SG1 is displayed on the main display, the video content V2 of the second audiovisual signal SG2 is displayed on the auxiliary display and the audio content A1 of the first audiovisual signal SG1 is played on the audio output(s) of the rendering system.

The viewer can thus watch at the same time the video content V1 and the video content V2 and listen the audio content A1.

Steps S2-S3

In a step S2, the audio content A2 of the second audiovisual signal SG2 is analyzed and, in a step S3, an event is detected in the audio content A2.

The event may relate to different characteristics of the audio content A2.

According to an embodiment, the event is linked to the audio power level of the audio content A2. The audio power level is compared to a predetermined threshold and when the audio power level exceeds the predetermined threshold, it can be considered that an important event occurs in the signal SG2. This embodiment is particularly suitable for football matches because the commentators generally start to speak louder and the spectators make more sound when the match gets interesting.

In this embodiment, the event detection comprises:

measuring an average audio power level (Root Mean Square value or RMS value) value of the audio content A2 over a sliding temporal window having a predetermined duration, and comparing the average audio power level with a predetermined audio power level threshold, the event being detected when the average audio power level is greater than said predetermined audio power level threshold.

According to another embodiment, the event relates to predetermined emotions detected in the audio content A2. These emotions can be for example stress, anxiety or happiness. In this embodiment, the event detection consists in detecting at least one of these emotions in the audio content A2, for example in the voice of the commentators of the football match. If stress, anxiety or happiness is detected, one can assume that an important event occurs or will occur in the football match. So, an event is detected.

Such emotions in a speech may be for example detected by a method disclosed in the following papers:

"*Prosodic Parameters and Prosodic Structures of French Emotional Data*" Katarina Bartkova, Denis Jouvet and Elisabeth Delais-Roussarie, 2016;

"*The Relevance of Voice Quality Features in Speaker Independent Emotion Recognition*", Marko Lugger, Bin Yang, 2007 IEEE International Conference on Acoustics, Speech and Signal Processing—ICASSP '07; and "*Automatic Personality Perception: Prediction of Trait Attribution Based on Prosodic Features*", G. Mohammadi, A. Vinciarelli, IEEE Transactions on Affective Computing, 2012.

According to another embodiment, the event is based on speech recognition and words pronounced in the second audiovisual signal. In this embodiment, the event detection comprises:

applying a speech recognition algorithm to the audio content A2, and detecting at least one predetermined word (or keyword) in the audio content A2, the event being detected when the predetermined word(s) is(are) detected in the audio content A2.

This embodiment can also be adapted to a football match. The event detection consists in detecting names of key players or words related to actions within the game, such as a penalty shot or a free kick. This embodiment can also be adapted for TV shows. The event detection consists for example in detecting the names of artists such as "Bruno Mars" if this is the artist the viewer is interested in. The keyword triggering mechanism could be on a keyword occurrence counter within a temporal window.

The keywords are for example detected by the method disclosed in the paper "*An Intelligent System for spoken term detection that uses belief combination*", Wasiq Khan and Kaya Kuru, 2017.

The keywords are previously inputted by the viewer in the system via a user interface or determined automatically from a user profile or user preferences of the viewer available by the rendering system.

According to another embodiment, the event detection is based on a number of words per time unit pronounced by a speaker in the audio content A2. If this number increases, it may mean that an event occurs or will occur. In a football match, the word rate of the commentator increases when a player arrives near the opponent's goal frame. In this embodiment, the detection of an event in the audio content A2 comprises:

applying a speech recognition algorithm to the audio content of the second audiovisual signal, counting a number of words per time unit, comparing said number of words per time unit with a predetermined threshold, and detecting at least one predetermined word in the audio content of the second audiovisual signal, said event being detected when the number of words per time unit is greater than said predetermined threshold.

According to another embodiment, the event detection is based on predetermined sounds detected in the audio content A2. These predetermined sounds are for example gunshots, police sirens.

Step S4

In a step S4, upon detection of the event, the audio content A2 is played, instead of the audio content A1, in the audio output.

Thus, the audio content A2 is automatically rendered by the audio output of the rendering system upon detection of an event. The viewer can then listen to the audio content A2 and is informed that an event of interest has occurred in the second audiovisual signal. He can then decide to switch manually the video contents displayed on the main display and the auxiliary display if he considers that, based on what he listens, the video content A2 should be displayed on the main display.

Step S5

In a preferred embodiment, the video contents of the first and second audiovisual signals are automatically switched upon detection of the event in a step S5.

Thus, upon detection of the event, the video content V2 is displayed on the main display while the video content V1 is displayed on the auxiliary display.

Step S6

In an improved embodiment, the audio content A1 and/or the video content V1 are/is stored in a storage device after the steps S4 or S5. This operation is performed in a step S6. In this embodiment, when the viewer is no more interested by the content of the signal SG2 (displayed on the main display), he can then view the stored content.

The decision of switching the video contents (step S5) or of storing the audio content A1 and/or the video content V1 (step S6) can be defined in user preferences stored in the rendering system.

Figure 2:
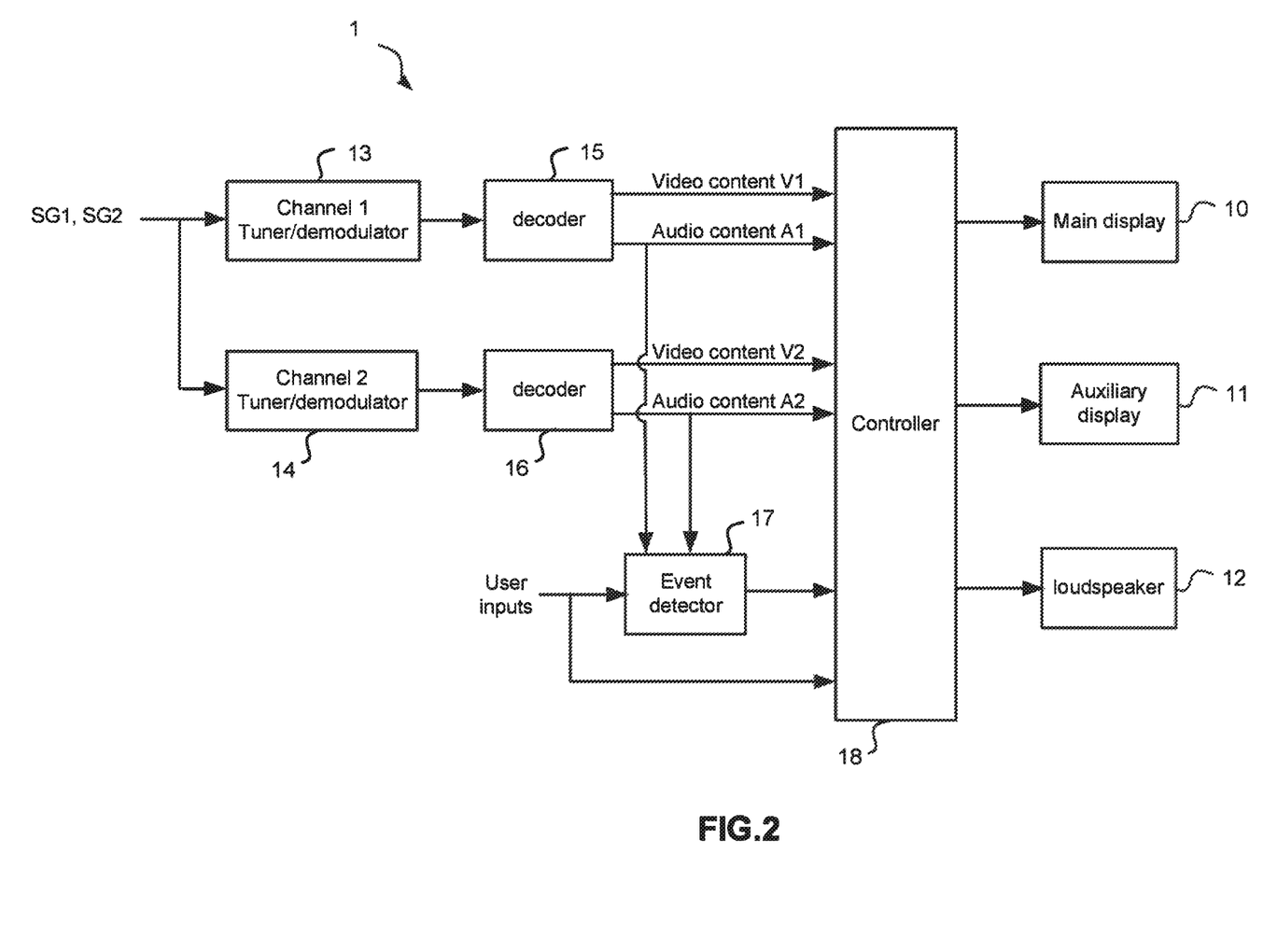
FIG. 2 is a schematic view of a rendering system implementing the steps of the method of FIG. 1.

The above-described method may be implemented in different rendering systems. The rendering system may be for example a TV receiver with a PIP function. FIG. 2 illustrates such a rendering system, referenced 1, capable of rendering two broadcast audiovisual signals SG1 and SG2. The rendering system 1 comprises a main display 10, an auxiliary display 11 and an audio output, for instance a loudspeaker 12. The main display 10 designates the screen of the TV set and the auxiliary display 11 designate a PIP window on the screen.

The rendering system comprises a tuner/demodulator 13 and a decoder 15 for processing the signal SG1 and outputting the video content V1 and the audio content A1. It also comprises a tuner/demodulator 14 and a decoder 16 for processing the signal S2 and outputting the video content V2 and the audio content A2.

The video contents V1, V2 and the audio contents A1, A2 are then transmitted to a controller 18 that controls the provision of the video contents and the audio contents to the main display 10, the auxiliary display 11 and the audio output 12.

The controller 18 controls the contents as a function of user inputs. The viewer can for example select the signal SG1 as the main signal and the signal SG2 as an auxiliary signal. So, the video content V1 is displayed on the main display 10, the video content V2 is displayed on the auxiliary display 11 and the audio content A1 is played on the audio output 12. The audio content A2 is mute.

According to an embodiment of the invention, the controller 18 also controls the contents as a function of events detected by an event detector 17. The event detector 17 analyses the audio content of the signal, SG1 or SG2, which is displayed on the auxiliary display. As described in reference to Step S2, the event is for example an increase of audio power level on a temporal window, a keyword in a speech or the appearance of stress in a voice.

Upon detection of such an event, the controller 18 modifies the audio content rendered by the audio output 12 and possibly the video contents rendered by the main display 10 and the auxiliary display 11.

Figure 3:
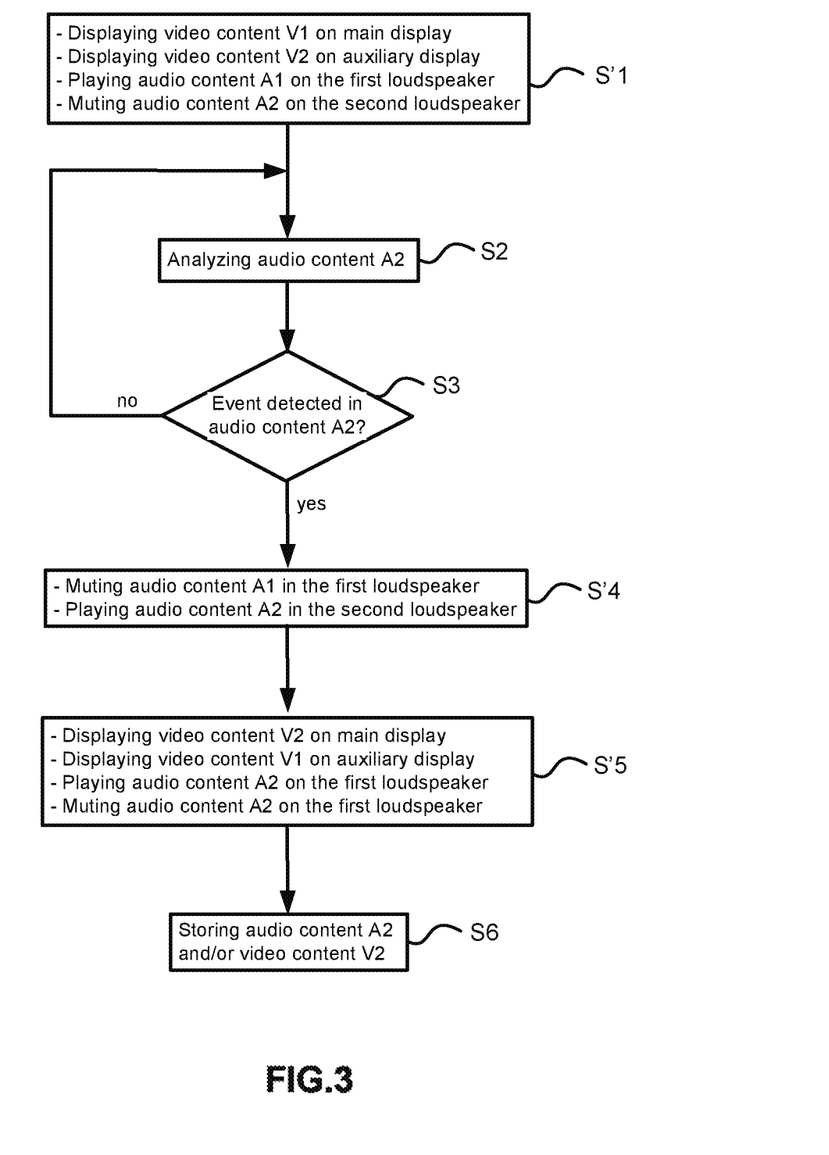
FIG. 3 is a flow chart of the successive steps implemented when performing a method according to a second embodiment of the invention.

FIG. 3 is the flow chart of the method of an embodiment of the invention for a rendering system comprising a main display, an auxiliary display, a first audio output linked to the main display and a second audio output linked to the auxiliary display. The main display is for example the screen of a TV receiver and the auxiliary display is the screen of a tablet. The first audio output is the audio output of the TV receiver and the second audio output is the audio output of the tablet. In that case, the method comprises additional precisions or some changes compared to the method illustrated in FIG. 1.

The steps S1, S4, S5, referenced S'1, S'4, S'5 in FIG. 3, are modified.

As the rendering system comprises a second audio output, the step S'1 indicates that the audio content A2 is muted on the second audio output during this step.

The steps S2 and S3 are unchanged.

In step S'4, the audio content A1 is muted in the first audio output and the audio content A2 is played in the second speaker.

In step S'5, the contents (audio and video) of the signal SG1 and the contents (audio and video) of the signal SG2 are switched or swapped automatically such that:
the video content V2 is displayed on the main display;
the video content V1 is displayed on the auxiliary display;
the audio content A2 is played in the first audio output; and
the audio content A2 is muted in the first audio output.

The step S6 is unchanged.

Figure 4:
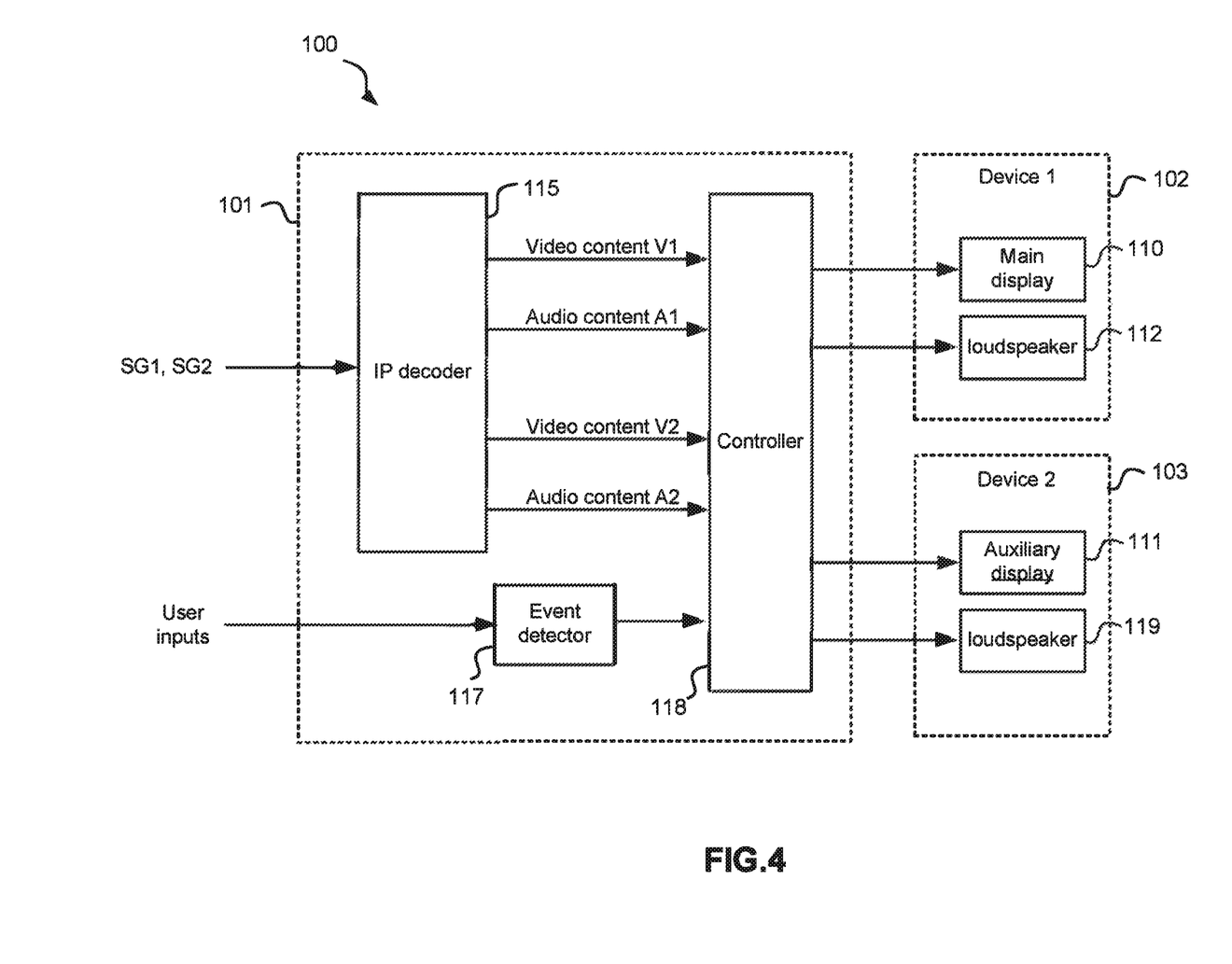
FIG. 4 is a schematic view of a rendering system implementing the steps of the method of FIG. 3.

A rendering system implementing the method of FIG. 3 is illustrated by FIG. 4. The rendering system, referenced 100, comprises:
a first device 102, such as for example a TV set, comprising a main display 110 and an audio output 112,
a second device 103, such as for example a tablet, comprising an auxiliary display 111 and an audio output, for instance a loudspeaker 119, and
a third device 101, such as for example a set-top box, comprising an IP decoder 115 for decoding signals SG1 and SG2, an event detector 117 (similar to event detector 17) and a controller 118 for controlling the provision of the video contents V1, V2 and the audio contents A1, A2 to devices 102 and 103.

The devices 102 and 103 are connected to the device 101 (set-top box) by appropriate links (wireless or not).

The controller 118 controls the video contents V1, V2 and the audio contents A1, A2 as defined in the flow chart of FIG. 3.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

For instance, it may be advantageous to implement at least a part of the detection of events in the audio content of the second audiovisual signal in a remote server rather than locally in the rendering system.

The invention claimed is:

1. A method for processing at least first and second audiovisual signals in a rendering system, each of said first and second audiovisual signals comprising a video content and an audio content, said rendering system comprising a main display, an auxiliary display and a first audio output, said method comprising:
displaying the video content of the first audiovisual signal on the main display and the video content of the second audiovisual signal on the auxiliary display and playing the audio content of the first audiovisual signal on the first audio output;
detecting an event in the audio content of the second audiovisual signal;
in response to detection of the event, playing the audio content of the second audiovisual signal, instead of the audio content of the first audiovisual signal; and
in response to detection of the event, switching displaying the video content of the second audiovisual signal from the auxiliary display to the main display and switching displaying the video content of the first audiovisual signal from the main display to the auxiliary display.

2. The method according to claim 1,
wherein the rendering system further comprises a second audio output, and
wherein, in the absence of detection of the event, the audio content of the first audiovisual signal is played in the first audio output and the audio content of the second audiovisual signal is muted in the second output and, in response to detection of the event, the audio content of the first audiovisual signal is muted in the first audio output and the audio content of the second audiovisual signal is played in the second audio output.

3. The method according to claim 1, wherein the method further comprises:
in response to detection of the event, storing the audio content and/or the video content of the first audiovisual signal in a storage device.

4. The method according to claim 1, wherein the detection of an event in the audio content of the second audiovisual signal comprises:
measuring an average audio power level of the audio content of the second audiovisual signal over a sliding temporal window having a predetermined duration; and
comparing said average audio power level with a predetermined audio power level threshold, said event being detected when said average audio power level is greater than said predetermined audio power level threshold.

5. The method according to claim 1, wherein the detection of an event in the audio content of the second audiovisual signal comprises:
detecting at least one predetermined emotion in the audio content of the second audiovisual signal, said event being detected when said at least one predetermined emotion is detected in the audio content of the second audiovisual signal.

6. The method according to claim 1, wherein the detection of an event in the audio content of the second audiovisual signal comprises:
applying a speech recognition algorithm to the audio content of the second audiovisual signal; and
detecting at least one predetermined word in the audio content of the second audiovisual signal, said event being detected when said at least one predetermined word is detected in the audio content of the second audiovisual signal.

7. The method according to claim 1, wherein the detection of an event in the audio content of the second audiovisual signal comprises:
applying a speech recognition algorithm to the audio content of the second audiovisual signal;
counting a number of words per time unit;
comparing said number of words per time unit with a predetermined threshold; and
detecting at least one predetermined word in the audio content of the second audiovisual signal, said event being detected when the number of words per time unit is greater than said predetermined threshold.

8. The method according to claim 1, wherein, in response to detection of the event, the audio content of the first audiovisual signal is muted and the audio content of the second audiovisual signal is played.

9. The method of claim 1, wherein detecting the event comprises determining a number of words per time unit in the audio content of the second audiovisual signal.

10. The method of claim 1, wherein detecting the event comprises determining an average audio power level of the audio content of the second audiovisual signal.

11. The method of claim 1, wherein detecting the event comprises detecting at least one emotion of stress, anxiety, or happiness.

12. The method of claim 1, wherein detecting the event comprises detecting at least one predetermined sound.

13. An apparatus configured to process at least first and second audiovisual signals, each of said first and second audiovisual signals comprising a video content and an audio content, said apparatus comprising:
a controller configured to control the display of the video content of the first and second audiovisual signals respectively on a main display and an auxiliary display and the playback of the audio content of the first audiovisual signal on a first audio output; and
a detector configured to detect an event in the audio content of the second audiovisual signal,
wherein the controller is further configured to, in response to detection of the event by the detector, play the audio content of the second audiovisual signal, instead of the audio content of the first audiovisual signal, and
wherein the controller is further configured, in response to detection of the event, to switch displaying the video content of the second audiovisual signal from the auxiliary display to the main display and switching displaying the video content of the first audiovisual signal from the main display to the auxiliary display.

14. The apparatus according to claim 13, wherein the controller is further configured, in the absence of detection of the event, to play the audio content of the first audiovisual signal on the first audio output and to mute the audio content of the second audiovisual signal on a second audio output and, in response to detection of the event, to mute the audio content of the first audiovisual signal on the first audio output and to play the audio content of the second audiovisual signal on the second audio output.

15. The apparatus according to claim 13, wherein the controller is further configured to, in response to detection of the event, store the audio content and/or the video content of the first audiovisual signal in a storage device.

16. The apparatus according to claim 13, wherein the detection of an event in the audio content of the second audiovisual signal is based on at least one of the following parameters:
the average audio power level of the audio content of the second audiovisual signal over a sliding temporal window having a predetermined duration;
the presence of at least one predetermined emotion in the audio content of the second audiovisual signal;
the presence of at least one predetermined word in the audio content of the second audiovisual signal; and
a number of words per time unit in the audio content of the second audiovisual signal.

17. The apparatus of claim 13, wherein the apparatus is further configured to determine a number of words per time unit in the audio content of the second audiovisual signal.

18. The apparatus of claim 13, wherein the auxiliary display comprises a Picture-in-Picture (PIP) window of the main display.

19. The apparatus of claim 13, wherein the apparatus comprises the main display.

20. The apparatus of claim 13, wherein the apparatus is configured to be communicatively coupled to the auxiliary display.

21. A computer program product comprising program code instructions that are operative, when the program code instructions are executed by a processor, to:
- display video content of a first audiovisual signal on a main display and video content of a second audiovisual signal on an auxiliary display;
- play audio content of the first audiovisual signal on an audio output;
- detect an event in audio content of the second audiovisual signal;
- in response to detection of the event, play the audio content of the second audiovisual signal instead of the audio content of the first audiovisual signal; and
- in response to detection of the event, switch displaying the video content of the second audiovisual signal from the auxiliary display to the main display and switch displaying the video content of the first audiovisual signal from the main display to the auxiliary display.

22. The computer program product of claim 21, wherein the auxiliary display comprises a Picture-in-Picture (PIP) window of the main display.

\* \* \* \* \*